(No Model.)
A. WEBBER.
MACHINE FOR KNEADING DOUGH.
No. 527,033. Patented Oct. 2, 1894.
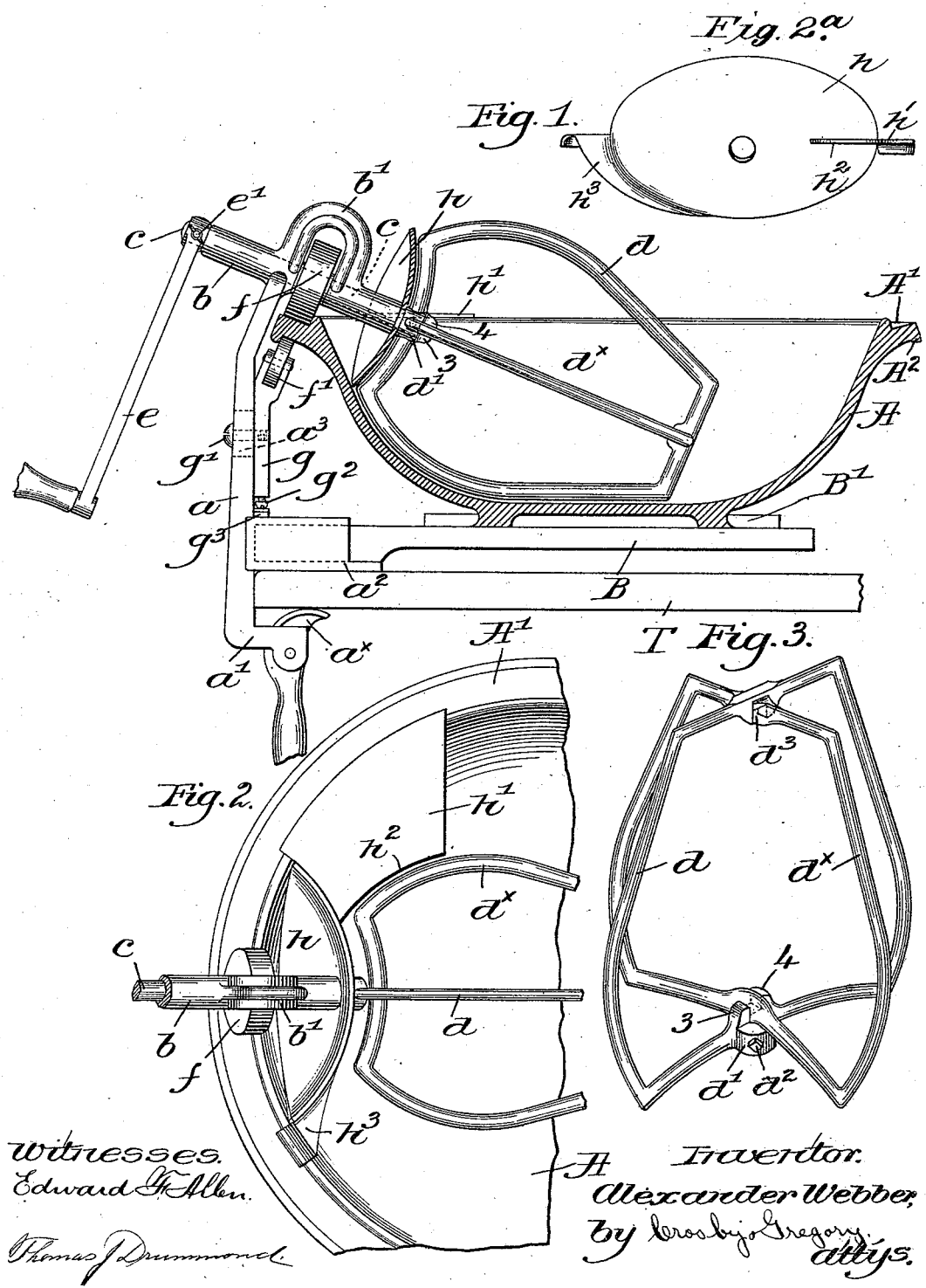
Witnesses.
Edward G. Allen.
Thomas J. Drummond
Inventor.
Alexander Webber,
by Crosby & Gregory
attys.

UNITED STATES PATENT OFFICE.

ALEXANDER WEBBER, OF BEVERLY, MASSACHUSETTS.

MACHINE FOR KNEADING DOUGH.

SPECIFICATION forming part of Letters Patent No. 527,033, dated October 2, 1894.

Application filed February 5, 1894. Serial No. 499,213. (No model.)

*To all whom it may concern:*

Be it known that I, ALEXANDER WEBBER, of Beverly, county of Essex, State of Massachusetts, have invented an Improvement in Machines for Kneading Dough, of which the following description, in connection with the accompanying drawings, is a specification, like letters and figures on the drawings representing like parts.
This invention has for its object the production of a dough kneading apparatus equally well adapted to knead stiff or heavy dough, or light dough, as for instance, cake batter, the pan or receptacle being positively rotated from the beginning to the end of the operation, its rotation being entirely independent of the character or quantity of material being kneaded or of the shape or construction of the kneading-blade.
In accordance therewith, my invention consists in the combination with a rotatable kneading-blade, and its actuating shaft, of a friction roll on said shaft, and a pan to contain the material, said pan being directly engaged and positively rotated by said roll, substantially as will be described.

Other features of my invention will be hereinafter described and particularly pointed out in the claims.
Figure 1 represents in elevation and partially in section an apparatus embodying my invention. Fig. 2 is a top view, partially broken out, to save space, of the apparatus shown in Fig. 1. Fig. 2$^a$ is a front view of the shield, with the lateral ring broken out to save space, and Fig. 3 is a perspective view of the kneading-blade.

I have herein shown an upright $a$, provided with an ear $a'$, and a hollow projection $a^2$, to receive between them a shelf or table T, to which the upright is secured by a suitable clamp, shown as a cam dog $a^x$ pivoted to the ear $a'$. An overhanging arm $b$ is secured to or forms a part of the upright, and through said arm a shaft $c$ is extended, to which the kneading-blade $d$ is attached, one end of the said shaft projecting beyond the arm $b$ to receive thereon a detachable handle $e$, held in place by a suitable clamp screw $e'$. The arm $b$ is preferably inclined toward the bottom of the receptacle or pan A, as shown in Fig. 1, and overhangs the rim thereof for some distance. A bend or offset $b'$ is formed in the overhanging arm, to accommodate a friction roll $f$, secured to the shaft $c$ in any suitable manner, and preferably having its periphery covered with rubber or similar material.

A removable base B, see Fig. 1, provided with guides B' for the bottom of the pan A, is cut away to enter the hollow projection $a^2$ of the upright, and be held thereby in the position shown.

The pan A, of any suitable material, preferably earthenware, is supported upon the base B, and I have herein shown the rim of the pan as grooved at its upper side, as at A', to receive and contact with the periphery of the friction roll $f$ and be maintained in engagement therewith, a slight tipping of the pan when putting it in position or removing it being sufficient to cause the grooved rim and the roll to engage or be disengaged.

From the foregoing, it will be seen that rotation of the shaft $c$ will rotate the friction roll $f$ and thereby cause the pan to rotate positively on the base B.

When a quantity of material is being manipulated, or it is very stiff, the roll $f$ might slip and fail to rotate the pan, and to obviate this, I have provided a presser roll $f'$, having its bearings in a support $g$ provided with a headed stud $g'$ extended through a slot $a^3$ in the upright $a$, see dotted lines Fig. 1, the support having at its lower end an adjustable stop, as a screw $g^2$, to bear on a stiff spring $g^3$, secured to the projection $a^2$, when the support is in the working position shown in Figs. 1 and 2. Adjustment of the stop $g^2$ moves the support and its roll $f'$ toward or away from the actuating roll $f$, the presser roll $f'$ bearing against and supporting the under side of the rim of the pan, as shown, the rim being preferably provided with a bead or annular projection $A^2$ upon its under side, to aid in guiding and positioning the pan. This adjustment of the presser roll provides for difference in thickness of the rim, and also regulates the amount of power which is exerted by the actuating roll upon the pan, according to the nature and quantity of material to be mixed. The two rolls guide the pan, and render unnecessary any bottom pivot therefor.

When the material has been properly mixed or kneaded the handle $e$ may be rotated in the opposite direction, thereby turning the support $g$ upon its pivot, and removing the roll $f'$ from the pan rim, when the pan can be readily disengaged from the roll $f$ and removed, the base B remaining in position or being taken away, as desired.

I have herein shown the kneading blade $d$ as skeleton in form, its outer edges corresponding to the contour of the interior of the pan, as clearly shown in Fig. 1, the blade being provided with a hub or boss $d'$, to receive the outer end of the shaft $c$, and it is held thereon by a suitable pin or set screw $d^2$, see Fig. 3, whereby the blade can be readily removed and cleaned. The skeleton form of blade makes its operation easier without detracting from the kneading effect it produces on the dough, and for ordinary bread or stiff dough the single blade will be sufficient.

When kneading or mixing up a light dough or batter, it is desirable to have greater mixing capacity in the blade, and to accomplish this, I use an auxiliary blade $d^x$, similar in shape to the blade $d$, and preferably detachably secured thereto at right angles, as shown in the drawings.

The narrow end of the blade $d$ is transversely notched, at $d^3$, to receive the narrow notched end of the auxiliary blade $d^x$, as clearly shown in Fig. 3, while the inner end of the hub or boss $d'$ is provided with upturned lugs 3, 4, of unequal height, separated sufficiently to receive between them the notched base of the auxiliary blade $d^x$. See Fig. 3.

The material of which the blades are made possesses enough elasticity to permit the blade $d^x$ to be sprung into place, its notched base passing over the shorter lug 3 and into the space between it and the longer lug 4, the latter serving as a limiting stop. By this construction one or both blades may be used, and the auxiliary blade may be readily and quickly put in place or detached.

I have provided a shield to prevent the dough from winding around the base of the kneading blade or from working up over the edge of the pan, the shield, as herein shown, consisting of a plate $h$ supported upon the arm $b$ at the base of the kneading blade $d$ and shaped to just clear the same when rotated, the shield being held in place by a lateral wing $h'$ resting upon the top of the pan rim and having its inner edge $h^2$ so shaped as to almost touch a portion of the outer edges of the blade, see Fig. 2, whereby the material is cut or broken so that it cannot collect on the blade at its base, or work over the edge of the pan. A rim clearer $h^3$ is secured to or forms a part of the plate $h$, see Figs. 2 and 2$^a$, bearing against the inner side of the pan from near the bottom of the plate $h$, to the rim of the pan to clear or scrape the material therefrom, and resting upon the top of the rim, the shield being so located as to prevent any of the material coming in contact with the rim of the pan or the rolls.

In operation, the material to be mixed or kneaded is placed in the pan A, and the blade rotated by means of the shaft $c$ and handle $e$, to stir or mix the material, and the pan is positively rotated to bring different portions of the material into the path of the blade. The arm $b$ forms a support or bearing for the actuating shaft, and covers or protects it throughout its length, so that it is impossible for the material to gather upon or clog the shaft.

My invention is not restricted to the exact construction and arrangement herein shown and described, as the same may be varied or modified without departing from the scope of my invention.

The apparatus is well adapted for mixing or kneading any ingredients which require a thorough incorporation and working.

I claim—

1. The combination with a rotatable kneading-blade and its actuating shaft, of a friction roll on said shaft, and a pan to contain the material, said pan being directly engaged and positively rotated by said roll, substantially as described.

2. The combination with a kneading blade, and its shaft, of an actuating roll on said shaft, a kneading pan in engagement therewith, and a presser roll adapted to bear upon and maintain the pan in engagement with the actuating roll, to be positively rotated thereby, substantially as described.

3. A rotating blade-actuating shaft, a kneading blade carried thereby, and an actuating roll on said shaft, combined with a kneading pan having a grooved rim to be engaged and positively rotated by said roll, and a rim shield or clearer for said pan, substantially as described.

4. The combination with a kneading pan, and an actuating roll in engagement therewith to positively rotate it, of an adjustable presser roll to maintain the pan in engagement with the actuating roll, said rolls guiding the pan in its rotation, and means to rotate the actuating roll, substantially as described.

5. In a kneading apparatus, a rotatable actuating shaft and a kneading blade carried thereby, combined with a support or bearing extended over the rim of and into the pan and through which the shaft is extended, to protect the latter, a kneading pan, and a shield for the base of the kneading-blade and the pan rim, substantially as described.

6. The combination with a kneading pan, a rotatable shaft, and connections between them to positively rotate the pan, of a skeleton kneading-blade attached to said shaft, and a detachable auxiliary blade adapted to be connected to the kneading-blade at an angle thereto, substantially as described.

7. The combination with a rotatable actuating shaft, and a friction roll thereon, of a pan to contain the material, directly engaged and positively rotated by said roll, a skeleton kneading-blade secured to said shaft, and a detachable auxiliary blade adapted to be sprung into place on said kneading-blade, substantially as described.

8. A rotatable blade actuating shaft, a kneading-blade detachably secured thereto, and a pan for the material, combined with frictional connections between said shaft and pan to rotate the latter positively, a shield located at the base of the blade, and clearers extended therefrom near the paths of movement of the blade and pan, substantially as described.

In testimony whereof I have signed my name to this specification in the presence of two subscribing witnesses.

ALEXANDER WEBBER.

Witnesses:
EMMA D. TRICKEY,
T. McCORNISH.